(12) United States Patent
Andrasak et al.

(10) Patent No.: US 9,195,498 B2
(45) Date of Patent: Nov. 24, 2015

(54) SUPPLY CAPABILITY ENGINE WEEKLY POLLER

(75) Inventors: Michael J. Andrasak, Red Hook, NY (US); Brian L. Merzbach, Newburgh, NY (US); Kathleen A. Ortolano, LaGrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 2642 days.

(21) Appl. No.: 11/679,952

(22) Filed: Feb. 28, 2007

(65) Prior Publication Data

US 2008/0235687 A1   Sep. 25, 2008

(51) Int. Cl.
*G06F 9/46*    (2006.01)
*G06F 9/48*    (2006.01)

(52) U.S. Cl.
CPC ............ *G06F 9/4843* (2013.01); *G06F 9/4881* (2013.01)

(58) Field of Classification Search
None
See application file for complete search history.

(56) References Cited

U.S. PATENT DOCUMENTS

| | | | |
|---|---|---|---|
| 4,034,347 A | 7/1977 | Probert, Jr. | |
| 6,131,109 A * | 10/2000 | Ueki et al. | 718/107 |
| 6,463,454 B1 * | 10/2002 | Lumelsky et al. | 718/105 |
| 6,904,483 B2 * | 6/2005 | Koning et al. | 710/244 |
| 6,944,862 B2 * | 9/2005 | Caggese et al. | 718/102 |
| 7,810,098 B2 * | 10/2010 | Barillari et al. | 718/104 |
| 8,171,481 B2 * | 5/2012 | Benedetti et al. | 718/104 |
| 2002/0165892 A1 * | 11/2002 | Grumann et al. | 709/100 |
| 2004/0199734 A1 * | 10/2004 | Rajamani et al. | 711/163 |
| 2005/0089053 A1 * | 4/2005 | Zhu | 370/412 |
| 2005/0138626 A1 * | 6/2005 | Nagami et al. | 718/105 |
| 2006/0173724 A1 * | 8/2006 | Trefler et al. | 705/8 |
| 2006/0206901 A1 * | 9/2006 | Chan | 718/107 |
| 2007/0016907 A1 * | 1/2007 | Benedetti et al. | 718/104 |
| 2007/0127691 A1 * | 6/2007 | Lert, Jr. | 379/265.05 |
| 2008/0209421 A1 * | 8/2008 | Scholtz | 718/101 |

OTHER PUBLICATIONS

Stewart et al., "Policy-Independent Real-Time Operating System Mechanisms for Timing Error Detection, Handling, and Monitoring," Oct. 22, 1996, Proceedings of HASE'96.*
Unknow Author, "Workload Automation V8.6 Fix Pack I—Alerts", Jan. 31, 2002, pic.dhe.ibm.com/infocenter/tivihelp/v47r1/index.jsp?topic=%2Fcom.ibm.tivoli.itws.doc_8.6%2Feqqc1mst23.htm.*
Unknown Author, "Task Definition Syntax for z/OS Jobs Scheduled with Tivoli Workload Scheduler", Jan. 31, 2002, publib.boulder.ibm.com/tividd/td/ITWS/SC32-1278-00/en_US/HTML/TWSAPPEX176.htm.*
Unknown Author, "Systems Management Integration,", Jan. 31, 2002, publib.boulder.ibm.com/tividd/td/TWS/SC32-1256-00/en_US/HTML/eqqg1mst25.htm.*

(Continued)

*Primary Examiner* — Jason Mitchell
*Assistant Examiner* — Kevin X Lu
(74) *Attorney, Agent, or Firm* — DeLio, Peterson & Curcio LLC; Kelly M. Nowak; Ronald Kaschak

(57) ABSTRACT

A method for executing and polling an operational slice of a supply capability engine. The method of polling is designed to query a DB2 table searching for a predetermined, eligible operational slice to process. When an operational slice is detected that is ready to be processed, an entry on a queue is placed, typically to a second DB2 table. The operational slices on the queue are then processed sequentially. The poller monitors the duration of the operational slice, and generates an alert if any of the operational slices placed on the queue exceed an allowable duration.

10 Claims, 1 Drawing Sheet

(56) References Cited

OTHER PUBLICATIONS

Unknown Author, "Creating Time-Dependent Operations," Jan. 31, 2002, publib.boulder.ibm.com/tividd/td/TWS/SC32-1256-00/en_US/HTML/eqqg1mst25.htm.*

Unknown Author, "IBM Tivoli Workload Scheduler for z/OS Applications for DFSMSrmm," Nov. 15, 2006, publib.boulder.ibm.com/infocenter/zos/v1r12/index.jsp?topic=%2Fcom.ibm.zos.r12.idarc00%2Fopcapp.htm.*

Unknown Author, "Operations with CA-7," Jan. 8, 2004, publib.boulder.ibm.com/tividd/td/ITWS/SC32-1278-00/en_US/HTML/TWSAPPEX182.htm.*

Unknow Author, "Web Dictionary of Cybernetics and Systems" on Monitoring, Jan. 2001, pespmc1.vub.ac.be/ASC/MONITORING.html.*

Unknown Author, "IBM Tivoli Workload Scheduler Version 8.2—Reference GUide", Dec. 2004.*

* cited by examiner

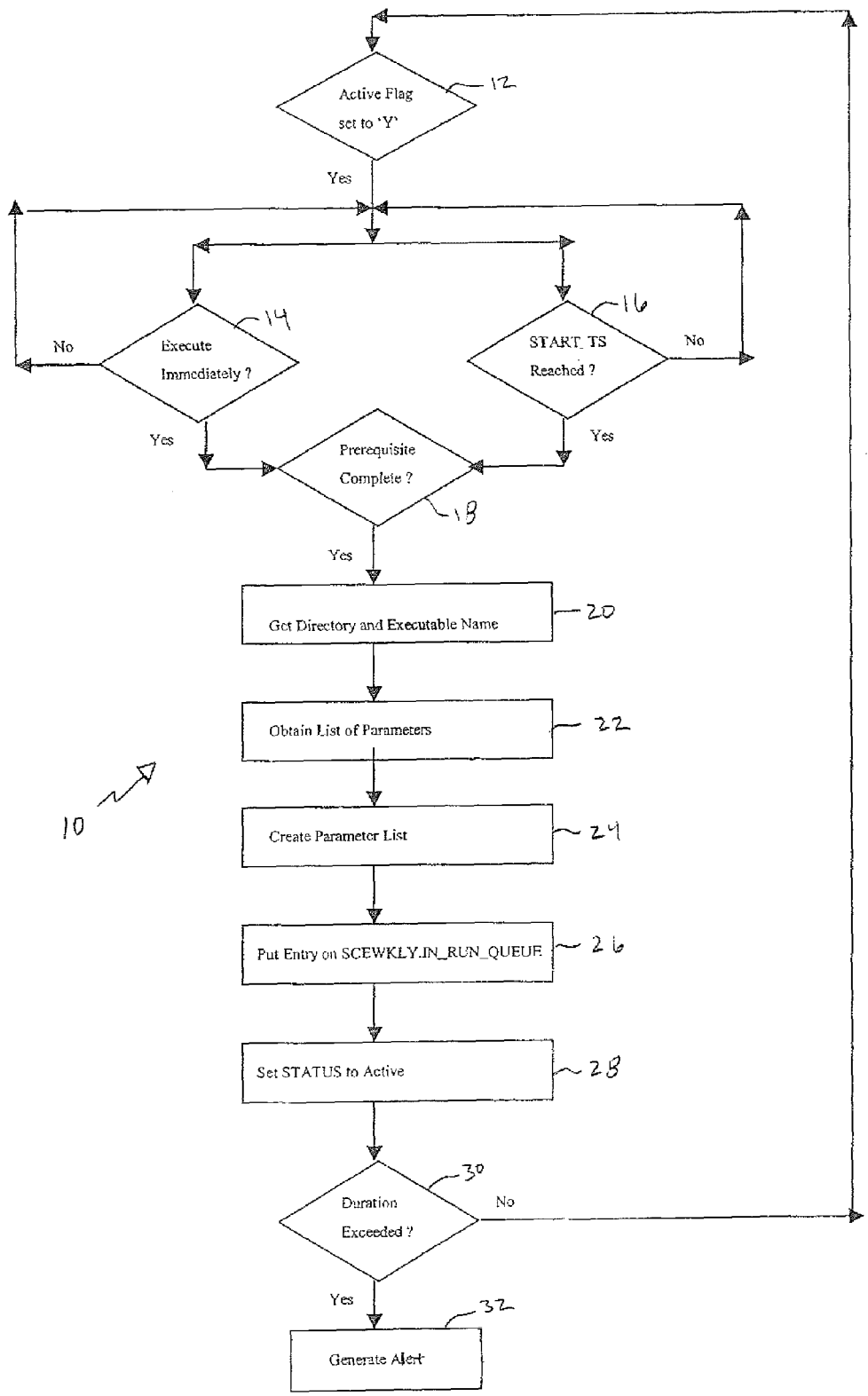

SUPPLY CAPABILITY ENGINE WEEKLY POLLER

BACKGROUND OF THE INVENTION

1. Field of the Invention

This invention is directed generally to a method for controlling operation of a supply chain management software tool, and in particular, to a method of using a software "poller" module to initiate and monitor operation of one or more computerized tasks or operational slices.

2. Description of Related Art

Many current applications employ "pollers", subroutines or sub-applications, that generally status the on-going activity being processed. The pollers deal with monitoring the processing of computerized tasks. For example, a poller may read a directory searching for the existence of a certain, predetermined task. If the poller detects the predetermined task, the task may be copied to a data directory and processed appropriately, untarred, unencrypted, and the like. Supply Capability Engine (SCE) applications generally require pollers that process tasks.

Polling a computer processor yields information regarding the status of the application software, and allows a user to implement instruction based on that current status. In prior art designs, pollers were first implemented as hardware interrupts. One type of hardware interrupt was described in U.S. Pat. No. 4,034,347 issued to Geoffrey Probert, Jr., entitled "METHOD AND APPARATUS FOR CONTROLLING A MULTIPROCESSOR SYSTEM." The Probert design taught a computer polling circuit and a separate memory polling circuit for controlling, respectively, the computer access to the memory sections and the memory section access to the computers. Each poller comprises a binary counter and clock for incrementing the counter. As the binary counter in the computer poller is incremented, for example, each computer is sequentially interrogated to determine whether or not it requires access to a memory section. If a memory request is detected, the counter then provides additional timing pulses and the requesting computer is given access to the requested memory section over the time multiplexed bus. The memory poller operates in a similar fashion. Eventually, pollers evolved chiefly into software applications.

It is known generally in the prior art to use pollers to control execution of computerized tasks, and such pollers are, in particular, known in the art of supply chain management software. However, the prior art has not taught or suggested providing a poller having the capability to execute multiple operational slices at one time. Moreover, it has not been known in the art to provide a poller having the ability to monitor a given slice while the slice is executing, or to determine if the duration of execution of the slice is outside a predetermined execution time.

SUMMARY OF THE INVENTION

Bearing in mind the problems and deficiencies of the prior art, it is therefore an object of the present invention to provide a method of polling with the capability to execute multiple operational slices at one time.

It is another object of the present invention to provide a method of polling with the capability of monitoring a given slice while a given operational slice is executing.

A further object of the invention is to provide a method of polling that includes determining if the duration of execution of an operational slice is outside a predetermined execution time.

Another object of the invention is to provide a method of polling that is capable of grouping multiple processes into unique groups.

Still other objects and advantages of the invention will in part be obvious and will in part be apparent from the specification.

The above and other objects, which will be apparent to those skilled in the art, are achieved in the present invention which is directed to a method of polling a supply capability engine comprising: querying a first DB2 table searching for predetermined operational slices to process; placing an entry on a queue; processing the operational slices on the queue sequentially; monitoring the duration of the operational slices; and generating an alert if any of the operational slices placed on the queue exceeds an allowable duration time. The method may include placing the entry on the queue using a second DB2 table. Operational slices may be executed at predetermined dates and times. The method may also include: scheduling execution of multiple processes; controlling execution of the multiple processes simultaneously; monitoring execution times of each of the multiple processes; and alerting an operator if an execution time of one of the multiple processes exceeds a predetermined limit.

In a second aspect, the present invention is directed to a method of polling a supply capability engine comprising: selecting an operational process slice from the supply capability engine weekly process table; setting an execute-immediately flag if immediate execution is desired, such that if a prerequisite process has successfully completed, execution of the operational process slice would immediately start even if a triggered start parameter did not timeout, or else monitor the triggered start parameter and initiate the operational process slice upon the triggered start timeout; obtaining an executable programming portion and an executable name from the library; generating a list of parameters; entering directory, command, and parameter lists in a run queue table that is defined within an SCE DB model; and setting a status column for the operational process slice. The supply capability engine weekly process table begins with a blank status and a triggered start time equal to or later than the current time. The method further includes waiting on the prerequisite process if the prerequisite process has not successfully completed. Additionally, the method may include: monitoring the operational process slice to determine length of run time; obtaining the operational process slice start time and duration value; and notifying a next level of support if the operational process slice is running long.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1 is a schematic of the supply capability engine weekly poller of the present invention.

DESCRIPTION OF THE PREFERRED EMBODIMENT(S)

In describing the preferred embodiment of the present invention, reference will be made herein to FIG. 1 of the drawings in which like numerals refer to like features of the invention.

The present invention is described herein with reference a flowchart illustration of method, apparatus (e.g., system), and computer program products, according to various aspects of the invention. It will be understood that the functional block diagram and/or the flowchart illustration, may be implemented by computer program instructions. These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function specified in the flowchart block. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the flowchart illustration support combinations of means for performing the specified functions, combinations of steps for performing the specified functions, and program instruction means for performing the specified functions. It will also be understood that each functional block of the flowchart illustration may be implemented by either special purpose hardware-based computer systems which perform the specified functions or steps, or suitable combinations of special purpose hardware and computer instructions.

The poller of the present invention is preferably designed to query a DB2 table searching for a predetermined, eligible task to process. When it detects a task that is ready to be processed, it places an entry on a queue, typically a second DB2 table. The tasks on the queue are then processed sequentially. The poller monitors the duration of the task, and generates an alert if any of the tasks placed on the queue exceeds the allowable duration.

The present invention uses a software poller module to initiate and monitor operation of one or more processes or operational slices. An operator can program the poller to execute specific operational slices at predetermined dates and times. The poller is capable of scheduling execution of multiple processes at once, controlling execution of multiple processes simultaneously, monitoring execution times of each process, and alerting an operator if an execution time of a given process exceeds a predetermined limit. The poller is also capable of grouping multiple processes into unique groups.

The preferable method for executing an operational slice of a supply capability engine is performed as discussed below, and in relation to the flow chart of FIG. 1.

First, a process is selected from a supply capability engine weekly process table, generally identified as scewkly.ref_auto_proc. This table begins with a blank status and a triggered start time, start_ts that is equal to or later than the current time. At this point in the program, the table's active flag is set ("Y"), and it is not waiting on a prerequisite process. If immediate execution is desired, the EXECUTE_IMMED column is set active ("Y"). When the prerequisite process has successfully completed, there would be no waiting for the start_ts to timeout in order for the process to initiate. The prerequisite task must only complete successfully. If there is no prerequisite task, the process may execute immediately. The process would wait on a prerequisite process if the prerequisite process does not have a complete status ("C"). When the process is immediately initiated, the time that the process is placed on a run queue is used for comparison when checking process duration in place of the start_ts value.

Next, the poller obtains the executable programming portion for the directory from the library, through the LIB column of the scewkly.ref_auto_roc table, and the executable name from the command column ("COMMAND") of the same table. The poller then creates a list of parameters by selecting the parameters from a parameter column ("PARM") of the scewkly.ref_auto_proc_parm table, where the SEQ value of the scewkly.ref_auto_proc_parm matches the SEQ value of the process in the scewkly.ref_auto_proc table. A list of parameters is built with the SLICE_ID and SEQ values from the scewkly.ref_auto_proc table entry being the first two parameters for this process. A separation designator, such as a space, or the like, distinguishes each parameter.

The directory, command, and parameter lists are entered in the scewkly.in_run_queue table, which is defined within the SCE Weekly DB model, where the job manager executes the process. The STATUS column for the process is then set to "A".

In order to determine if a process is running too long, the SCE poller first selects all processes from the scewkly.ref_auto_proc where the STATUS column is set to "A". It then obtains the time that the process started plus the duration value, preferably identified in minutes less than the current time. Last, it notifies the next level of support that the process is running long.

FIG. 1 depicts a flow chart 10 of the Supply Capability Engine Weekly poller of the present invention. The poller process is defined in a loop configuration. First, an active flag is queried 12 to ascertain its set status ("Y"). If the active flag is set, the execution start is then determined. If the poller is not set to execute immediately 14, then the triggered start is measured to determine if the START_TS has been reached 16. If either the execute-immediately condition is activated, or the triggered start has been reached, the poller then determines if the prerequisite process has been completed 18. If, and when, the prerequisite process has been completed, the poller performs specific process steps:

a. obtaining a directory and executable name 20;
    b. obtaining a list of parameters 22;
    c. creating a parameter list 24;
    d. establishing an entry in the run queue 26, specifically the scewkly.in_run_queue; and
    e. setting the STATUS flag to active 28.

The poller then monitors the duration time to determine of the duration period has been exceeded 30. If the duration period has not been exceeded, the process iterates back to checking for an active flag 12, and repeating the above-identified steps. If the duration period has been exceeded, an alert is generated 32.

The present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

The invention claimed is:

1. A method of polling a supply capability engine weekly process table comprising:
   providing a software poller module;
   the software poller module querying and selecting one or more operational process slices from said supply capability engine weekly process table, the supply capability engine weekly process table having a blank status and a triggered start time;
   setting an execute-immediately flag if immediate execution is desired, such that if a prerequisite process has successfully completed, execution of said one or more operational process slices immediately starts even if the triggered start did not timeout, or else monitor said triggered start time and initiate said one or more operational process slices upon timeout of said triggered start time;
   the software poller module obtaining an executable programming portion for a directory from a library of the supply capability engine weekly process table and an executable name from the supply capability engine weekly process table;
   generating a list of parameters by selecting parameters from a parameter table;
   entering the executable programming portion for the directory, the executable name, and the generated parameter lists in a run queue table that is defined within an SCE DB model;
   placing the one or more selected operational process slices on the run queue table;
   executing the one or more operational process slices in the run queue table, and setting a status column in the supply capability engine weekly process table for said executing one or more operational process slices with status identifier "A";
   the software poller module selecting all operational process slices having status identifier "A" from the supply capability engine weekly process table, and determining process run times thereof; and
   the software poller module immediately generating an alert if any determined run time of said one or more operational process slice exceeds an allowable duration time.

2. The method of claim 1 including waiting on said prerequisite process if said prerequisite process has not successfully completed.

3. The method of claim 1 wherein said step of generating said list of parameters comprises selecting said parameters from a parameter column of said supply capability engine parameter table, where an SEQ value of said parameter table matches an SEQ value in said process table.

4. The method of claim 1 wherein the step of determining process run times thereof includes: determining process run times thereof
   monitoring each of said selected operational process slices to determine length of run time thereof;
   obtaining each of said operational process slices start time and duration value; and
   notifying a next level of support if any run time of any of said operational process slices exceeds the allowable duration time.

5. The method of claim 4 wherein said step of notifying said next level of support includes generating an alert command.

6. The method of claim 1 including executing multiple of the one or more selected operational process slices simultaneously.

7. The method of claim 6 including monitoring execution times of the one or more selected operational process slices being executed simultaneously, and alerting an operator if an execution time of any of said operational process slices exceeds its allowable duration time.

8. The method of claim 7 wherein when any one of the one or more operational process slices is immediately initiated the time that it is placed on the queue is used in monitoring the execution time thereof.

9. The method of claim 6 including executing said one or more predetermined operational slices at predetermined dates and times.

10. The method of claim 9 including:
    scheduling execution of multiple one or more predetermined operational slices;
    controlling execution of said multiple one or more predetermined operational slices simultaneously;
    monitoring execution times of each of said multiple one or more predetermined operational slices; and
    immediately alerting an operator if an execution time of one of said multiple one or more predetermined operational slices exceeds a predetermined limit.

* * * * *